United States Patent [19]
Hettinga

[11] Patent Number: 5,151,237
[45] Date of Patent: Sep. 29, 1992

[54] METHOD OF INJECTION MOLDING A FLAT DEFORMABLE LAMINATE

[76] Inventor: Siebolt Hettinga, 2123 NW. 111th St., Des Moines, Iowa 50322

[21] Appl. No.: 535,609

[22] Filed: Jun. 11, 1990

[51] Int. Cl.⁵ .................. B29C 45/14; B29C 45.16
[52] U.S. Cl. .................. 264/257; 264/273; 264/274; 264/324; 264/325; 264/328.1
[58] Field of Search ............ 264/319, 324, 325, 255, 264/257, 273, 274, 328.1

[56] References Cited
U.S. PATENT DOCUMENTS

| | | | |
|---|---|---|---|
| 3,713,936 | 1/1973 | Ramsay | 264/257 |
| 4,276,346 | 6/1981 | Bramwell | 264/257 |
| 4,579,764 | 4/1986 | Peoples, Jr. | 264/257 |
| 4,744,848 | 5/1988 | Andrew | 264/257 |
| 4,873,045 | 10/1989 | Fujita | 264/257 |

*Primary Examiner*—Jay H. Woo
*Assistant Examiner*—Jeremiah F. Durkin, II
*Attorney, Agent, or Firm*—Rudolph L. Lowell; Kent A. Herink; Brian J. Laurenzo

[57] ABSTRACT

A method for the injection molding of a laminate article having a deformable material sandwiched between a textile layer and a thermoplastic substrate and bonded into a unitary assembly by the thermoplastic. The laminate is molded into a sheet form for deformation to a preselected shape in a die-forming operation.

5 Claims, 2 Drawing Sheets

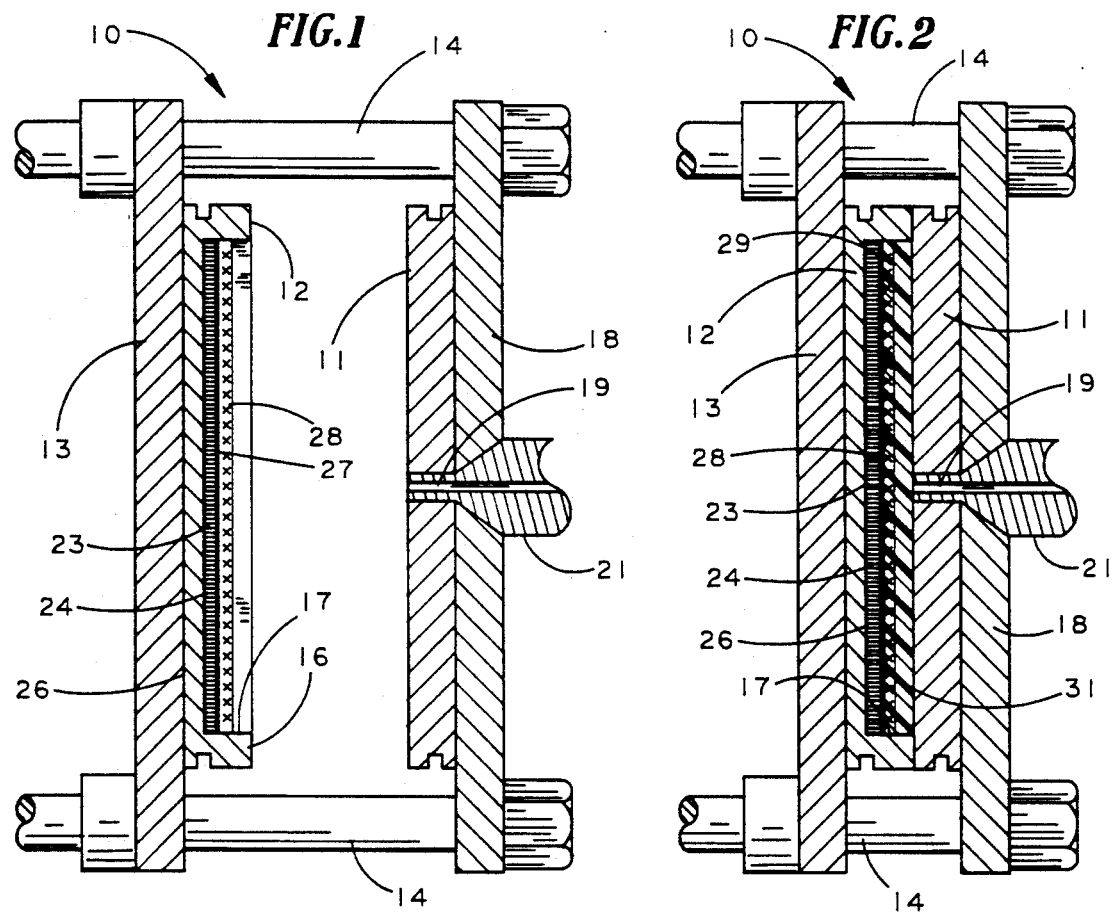
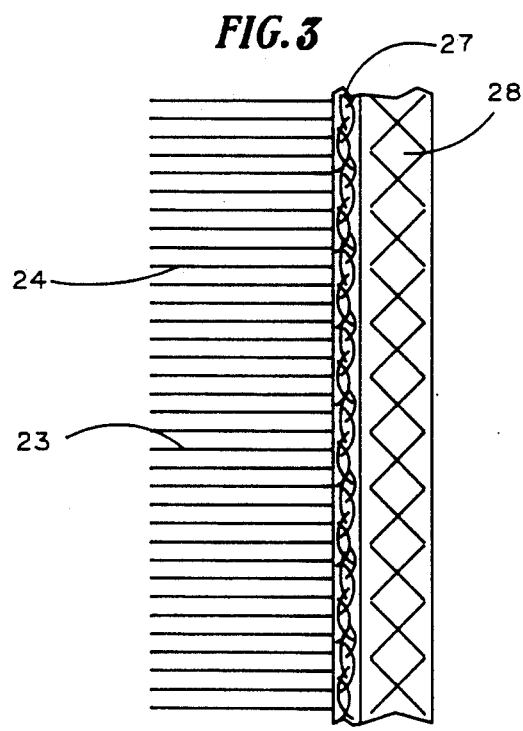

METHOD OF INJECTION MOLDING A FLAT DEFORMABLE LAMINATE

This invention relates to the method of injection molding a flat deformable laminate having a deformable material sandwiched between a thermoplastic substrate and a sheet textile material. More particularly, this invention relates to a flat deformable molded laminate that is readily formed into an article of predetermined shape conforming to the shape of a preselected surface for assembly thereon with the textile material exposed.

BACKGROUND OF THE INVENTION

It is conventional to produce a laminate article comprised of a stiff substrate material such as plastic, compressed paper or wood, to which is adhesively secured a textile material. However, in some instances, a fibrous or asphalt base material has been used in glove compartments and in vehicle trunks. This type material is then cut and fitted to conform to the surface which it is to cover, such as the floor and sidewall surfaces of the vehicle trunk or the interior side surfaces of the passenger body of the automotive vehicle. Where the textile material is adhesively secured to a stiff substrate material, the textile material tends to separate from the substrate, particularly along the edges thereof. Additionally, appreciable expense is encountered in the on-the-job fitting of this type laminate to conform with the surface being covered. Further, the laminate is not adaptable to cover the floor surface within the vehicle, which generally includes irregularities to accommodate the drive system of the vehicle.

SUMMARY OF THE INVENTION

The laminate of the invention is injection molded in a flat deformable sheet form which is readily deformed to a predetermined shape conforming to the shape of the surface on which the laminate article is to be mounted. In the molding of the laminate, a thermoplastic resin is initially injected into a chamber means and then about the deformable material into a soft porous material to form a unitary laminate bonded together by the thermoplastic material. The laminate, prior to being formed, may be heated to facilitate the deforming of the thermoplastic substrate, with the formed shape then being retained by the bonded securement of the substrate and porous material to the deformable material. The resultant laminate article is thus readily secured to an associated mounting surface without requiring further on-the-job fitting. With the porous material bonded to the substrate and deformable material, stripping thereof from the laminate article is substantially eliminated. The completed resultant laminate articles may comprise the wall structure of a glove compartment, a vehicle trunk, or a unitary rigid floor covering for the front and rear floor surfaces of a vehicle.

BRIEF DESCRIPTION OF THE DRAWINGS

FIG. 1 is a cross-sectional view of an injection mold for injection molding, in accordance with this invention, shown in open position and illustrating the placement in the mold cavity thereof of the textile and deformable materials of the resultant laminate article, FIG. 2 is illustrated similarly to FIG. 1 and shows the mold in the cavity closing position for forming the completed laminate structure, FIG. 3 is an enlarged showing of the laminate portions illustrated in FIG. 1.

DETAILED DESCRIPTION OF THE INVENTION

Figure 4:
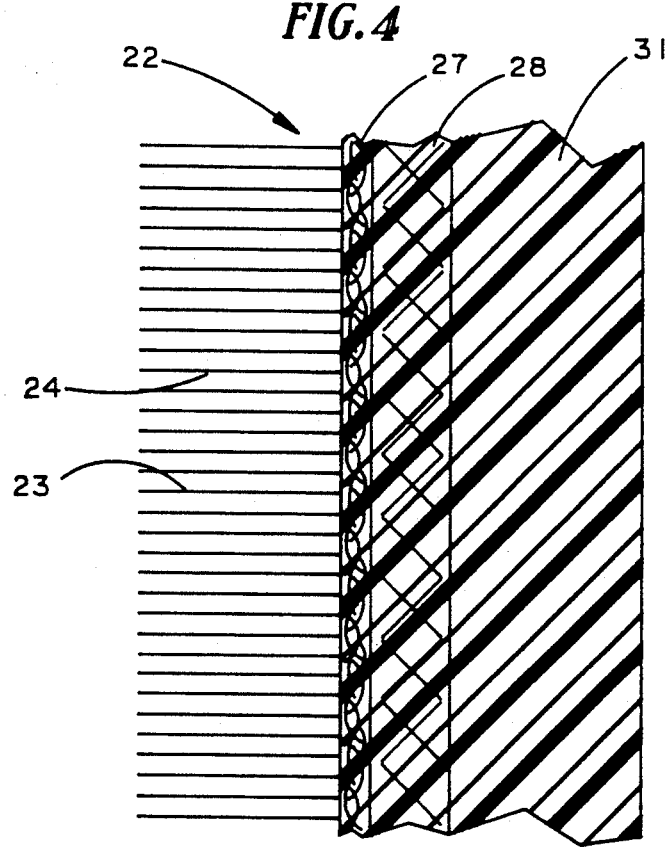
FIG. 4 is an enlarged showing of the completed laminate shown in FIG. 2.

Referring to FIG. 1 of the drawings, there is illustrated a mold unit 10 of a conventional mold injecting machine (not shown), having a stationary section 11 and a movable section 12 secured to a baseplate 13 that is movably supported on slide or guide rods 14 in response to the operation of a usual hydraulic ram (not shown).

The movable mold section 12 is preferably of a generally rectangular pan shape having an upstanding perimetral rim 16 forming a mold cavity 17. The stationary mold section 11 is of a generally flat plate form secured to a mounting number 18 and of a size to engage the perimetral rim 16 of the mold section 12 to close the mold cavity 17 when the mold unit 10 is in the closed position therefor. The stationary mold 11 and its mounting member 18 are formed with a gate 19 for operative association with an injection nozzle unit 21 of the mold injection machine.

To injection mold the flat laminate article of this invention, indicated at 22 in FIG. 4, a soft porous material 23 (FIG. 1), illustrated as a rug material of a shape and size to fit within the cavity rim 16, is positioned with the pile side 24 thereof against the flat bottom surface 26 of the cavity 17. As used herein, the term soft porous material may include a foam rubber, pile, rubber, felt, fabric, or rug material and the like. A deformable sheet material 28, illustrated as a window screen material, is then positioned against and over the mat surface 27 of the ruglike material 23. The deformable material may be a hardware screen material, perforated sheet metal, expanded material, a plastic material, or a wire rod material.

Figure 5:
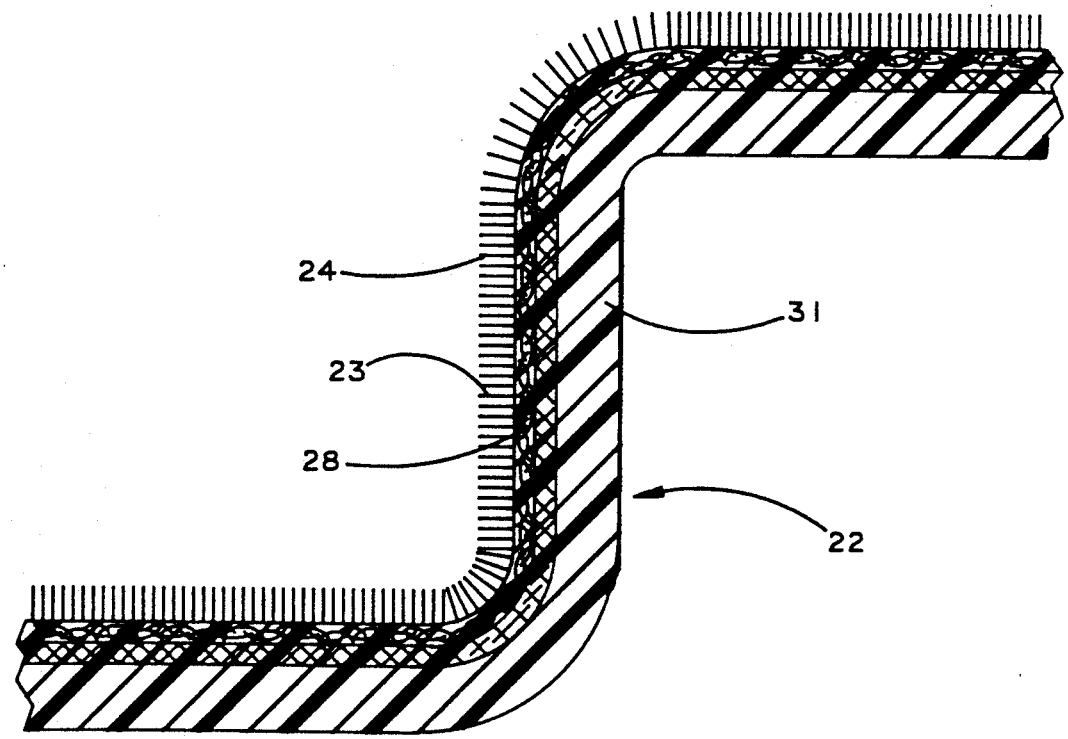
FIG. 5 illustrates in section the laminate structure of FIG. 4 after being deformed into a specific shape.

With the rug material 23 and screen material 28 in a back-to-back relation within the mold cavity 17, the mold unit is closed as shown in FIG. 2. With the fixed mold section 11 in engagement with the rim 16 of the movable mold section 12, there is formed a chamber 29, defined by the rim 16, the mold section 11 and the screen material 28, to receive the thermoplastic material injected from the nozzle 21 and into the gate opening 19 which is in fluid registration with the chamber 29. The injected plastic, from the chamber 29, passes through the screen material 28 and into the mat surface 27 of the rug material 23. On cooling, the thermoplastic in the chamber means 29 forms a substrate layer 31 for the laminate 22 and by virtue of its passage about the mesh material 28 and into the mat 27 of the rug material 23 bonds the laminate into a reinforced unitary structure. The thermoplastic material may be a polypropylene resin or a polyvinyl chloride injected at a plasticizing temperature of not less than about 450° F. On removal from the mold unit 10, the laminate 22 on being cooled may be readily stored or transported in conveniently-sized packages for later use. To facilitate forming the laminate into a predetermined shape, such as illustrated for the laminate in FIG. 5, it may be initially heated to a temperature of about 250° to facilitate the deformation of the substrate layer 31. It is to be understood that the laminate 22 may be hand or machine deformed into the predetermined shape therefor immediately after being mold injected by merely permitting it to cool to a temperature of about 250° F. prior to the forming operation.

For the laminate 22 to retain the preselected deformed shape, the deformable material should have a memory recovery or capability of regaining its original shape which is less than the memory recovery of the plastic substrate, so as not to warp or otherwise overcome the preselected shape of the plastic substrate and, in turn, the preselected deformed shape of the laminate 22, so as to further resist any recovery movement of the substrate to the initial flat condition thereof.

It is to be understood that modifications may be made in the practice of this invention within the scope of the appended claims.

I claim:

1. A process of injection molding for forming a flat deformable laminate having a thermoplastic substrate, as the bonding agent, said process comprising:
   (a) providing a thermoplastic resin and a deformable material wherein the memory recovery of the deformable material is less than the memory recovery of the thermoplastic resin;
   (b) providing a soft porous material;
   (c) lining a flat surface area of an injection mold cavity with said soft material;
   (d) placing the deformable material against said soft material;
   (e) closing said mold cavity with a second flat surface spaced from said deformable material to form a plastic receiving chamber means;
   (f) injecting the thermoplastic resin within said chamber means and about said deformable material and into said soft material;
   (g) allowing said thermoplastic resin to at least partially cool and harden; and then
   (h) removing the resultant flat deformable laminate from the cavity, said flat deformable laminate capable of further deformation into a preselected shape after removal from said cavity.

2. The process, according to claim 1, including the further step of forming the resultant laminate into said preselected shape, said preselected shape retained by the bonded securement of the substrate and porous material to the deformable material.

3. The process, according to claim 1, wherein the soft porous material is comprised of a fabric material having a pile surface, the pile surface of which is positioned against the first flat surface of the mold cavity.

4. The process, according to claim 1, wherein the deformable material is selected from the group consisting of a screen material, a wire rod material or a plastic material.

5. The process, according to claim 3, including the step of placing the resultant laminate in a forming die; and forming an article of a preselected shape conforming to the shape of a preselected surface for assembly thereon with the substrate surface adjacent the preselected surface.

* * * * *